United States Patent [19]
Nishimura et al.

[11] Patent Number: 5,245,346
[45] Date of Patent: Sep. 14, 1993

[54] INTERROGATOR/TRANSPONDER SYSTEM AND MOBILE TRANSPONDER DEVICE

[75] Inventors: Yoshihiro Nishimura; Kazuhiro Kozuka, both of Aichi; Hidehiro Tomioka, Ibaraki; Shin Yamamoto, Aichi; Norikazu Ohta, Aichi; Yoshihisa Harata, Aichi; Souichi Isikawa, Aichi; Takehiko Okuda, Aichi, all of Japan

[73] Assignees: Kabushiki Kaisha Toyota Chuo Kenyusho, Aichi; Toyota Jidosha Kabushiki Kaisha, Toyota both of Japan

[21] Appl. No.: 743,340

[22] PCT Filed: Sep. 28, 1990

[86] PCT No.: PCT/JP90/01249
§ 371 Date: Aug. 28, 1991
§ 102(e) Date: Aug. 28, 1991

[87] PCT Pub. No.: WO91/10290
PCT Pub. Date: Jul. 11, 1991

[30] Foreign Application Priority Data
Dec. 28, 1989 [JP] Japan ................... 1-344612

[51] Int. Cl.[5] ............................................. G01S 13/74
[52] U.S. Cl. ........................................ 342/42; 342/43; 342/51
[58] Field of Search .................... 342/42, 51, 43

[56] References Cited

U.S. PATENT DOCUMENTS

| 4,242,661 | 12/1980 | Henoch et al. |
|---|---|---|
| 4,641,374 | 2/1987 | Oyama .................... 455/603 |
| 4,926,182 | 5/1990 | Ohta et al. |
| 4,980,689 | 12/1990 | Kawakami .................. 342/51 |

FOREIGN PATENT DOCUMENTS

| 346922 | 12/1989 | European Pat. Off. |
|---|---|---|
| 51-142293 | 12/1976 | Japan |
| 79476 | 5/1982 | Japan |
| 201177 | 9/1986 | Japan |
| 61-240719 | 10/1986 | Japan |
| 64-80892 | 3/1989 | Japan |

Primary Examiner—Mark Hellner
Attorney, Agent, or Firm—Oblon, Spivak, McClelland, Maier & Neustadt

[57] ABSTRACT

An interrogation responder system composed of a transmitter stationarily mounted in a certain fixed place and a receiver mounted on a mobile object. The receiver on the mobile side starts the operation when a power is supplied to the entire circuit in accordance with a wake-up signal from the transmitter on the fixed side so as to modulate the electromagnetic signal emitted from the transmitter on the fixed side in accordance with a predetermined code and reflect a response. This enables continuing bilateral communication of a command, data and so forth. By starting communication between the transmitter and the receiver by a direct wave of a carrier signal in a microwave band after sensing that the receiver on the mobile side has entered a good communication zone, secure communication is enabled at a sufficient electric field strength.

8 Claims, 5 Drawing Sheets

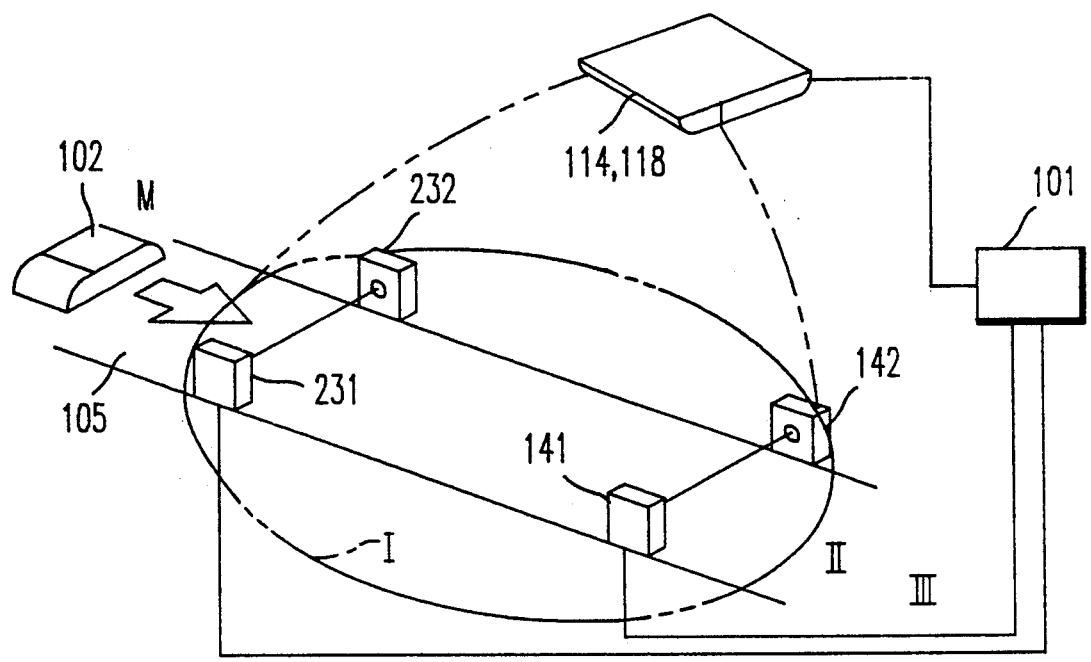
*FIG. 7*
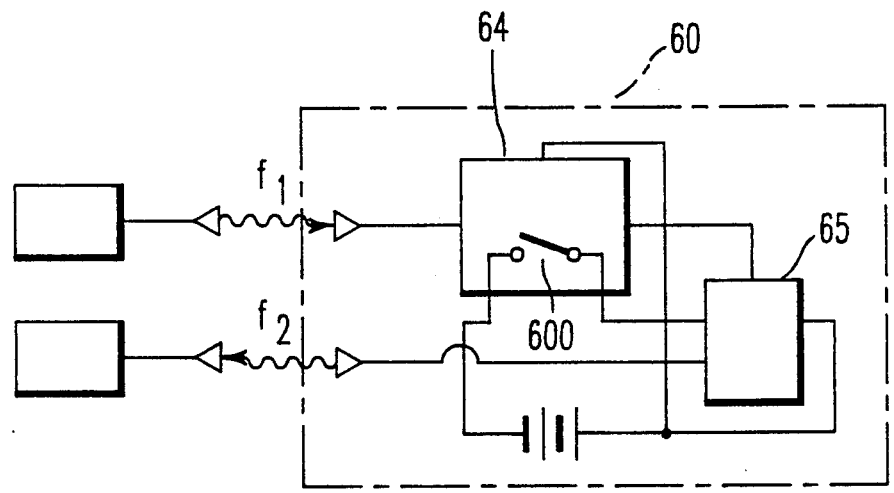
*FIG. 8*
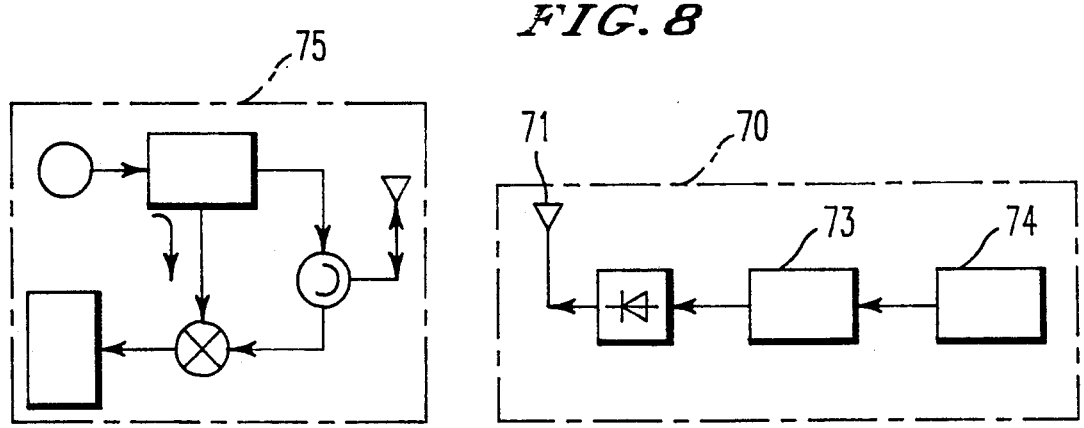
*FIG. 9a*   *FIG. 9b*

INTERROGATOR/TRANSPONDER SYSTEM AND MOBILE TRANSPONDER DEVICE

TECHNICAL FIELD

The present invention relates to a mobile communication system and, more particularly, to interrogation transponder system capable of high-speed communication at reduced power dissipation.

BACKGROUND ART

A mobile communication system for delivering communications between a transmitter (interrogator) stationarily mounted in a certain fixed place (hereinunder referred to as "on the fixed side") and a simple receiver (transponder) called tag which is mounted on a mobile object (hereinunder referred to as "on the mobile side") has attracted attention. Such a mobile communication system is used for, for example, identifying an object or a person in a communication zone noncontactingly from an identification signal reflected by the transponder with respect to an interrogation signal emitted from the interrogator to the transponder carried by said object or person.

In most of such mobile communication systems, batteries are used as a power source of the transponder due to its simplicity and light weight, and one of the problems to be solved is to prolong the life time of the battery by reducing the power dissipation.

To solve this problem, a power is only supplied to a circuit 64 which is necessary for the reception of an interrogation signal and at the point where the interrogation signal is received, a switching circuit 600 is actuated so as to feed a remaining signal processing means 65, thereby reducing the constant power dissipation, as shown in FIG. 8 (e.g., Japanese Patent Laid-Open No. 201177/1986. Hereinunder, this communication system is referred to as the former communication system).

As shown in FIG. 9, there is another mobile communication system for identifying data by using a compact transponder 70 having a simple structure which receives an unmodulated signal from an interrogator 75 and reflects a response signal imparted with identification data to the interrogator 75 (e.g., Japanese Patent Laid-Open No. 79476/1982. Hereinunder, this communication system is referred to as the latter communication system). However, in the latter communication system shown in FIG. 9 having the above-described structure, only the identification data which is set in advance can be read out. In addition, in order to make the transponder 70 compact and sufficed with a simple circuit structure, a code generator 74 and a low-frequency signal generator 73 for generating the data must also have a simple structure, so that the identification data are limited to several hundred bits (several ten bytes) at most and storage and control of a large amount of information such as several thousand bytes is very difficult. It is necessary for the interrogator 75 to store and control all the induced information based on the identification data read out, and in a system having an increased number of transponders 70 and a plurality of interrogators 75, there are problems to be solved for practical use such as an enlarged and complicated system due to the increase in memories and the necessity for networking. The former communication system has been aimed at only identifying the transponder and reading data from the transponder. In recent years, however, the application of the communication system to a wider field necessitates emitting from the interrogator to the transponder various command signals for commanding the delivery of necessary data or writing various data signals from the interrogator in the memory of the transponder.

In this case, it is necessary to increase the data transmission speed i.e., the rate of transmission of data, in order to communicate necessary command or data signals within a short time in which the transponder passes the communication zone with the interrogator. For this purpose, it is necessary to set the frequency band of the receiver of the transponder at a frequency so high as to sufficiently cover the data transmission speed, which inevitably increases the electric power dissipation of the receiver to which the power is constantly supplied.

To state this in detail, the former communication system is based on the idea that although it is necessary to constantly supply a power to the starting circuit 64 (generally including an amplifier) for receiving a wake-up signal, this system is sufficed with a smaller power dissipation than the system for supplying a power to the signal processing means composed of a frequency converter and a code converter. In this case, in the case of writing a data signal to the transponder, the data signal is subsequently received after the wake-up signal is received. Therefore, in order to transmit a high-speed data signal, i.e., a data signal transmitted at a high data rate, the starting circuit 64 is required to have a high-frequency band corresponding to a data transmitting speed so as to prevent the distortion of the waveform of the high-speed data signal and to adequately obtain a predetermined gain.

Since the current dissipation of such a circuit (a signal amplifier included in the starting circuit) generally increases in proportion to the height of the frequency band, the current dissipation of the starting circuit 64 during the period of waiting for the reception of the high-speed data signal greatly increased in the former communication system. In addition, when the transmission speed is increased and the data transmission time is shortened, the ratio of the power which is constantly dissipated in the starting circuit 64 to the power dissipation of the transponder as a whole is increased. Therefore, high-speed transmission is impossible in the transponder of the former communication system.

Attempt has been made at utilizing the latter mobile communication system for directing production and managing transportation in the production lines of factories. For this purpose, since a comparatively large amount of data such as several ten characters to several thousand characters is transmitted, the communication system is required to transmit data with certainty and at a high speed within a restricted communication time under a noise environment.

Accordingly, the present inventors have invented a mobile communication system and a mobile communication device which is capable of not only reading out an identification signal but also writing and reading a large amount of information of various kinds to and from a receiver (transponder) on the mobile side at a high speed i.e., at a high data rate, and with a high quality, storing and controlling the information by the transponder, and reducing the power dissipation and prolonging the life time of the transponder in spite of high-speed transmission.

DISCLOSURE OF THE INVENTION

An object of the present invention is to solve the above-described problems in the prior art and to provide an interrogator/transponder system which is capable of transmitting data to a transponder device mounted on a mobile object at a high speed and greatly reducing the power dissipation of the transponder device.

Another object of the present invention is to meet the above-described demand and to provide an interrogator transponder system which is capable of realizing secure and high-speed data transmission.

As a means for solving the above-described problems, an interrogator/transponder system according to the present invention has the following structure.

The system provided in one aspect of the present invention is a system comprising a transmitter on the fixed side and a receiver on the mobile side. The transmitter on the fixed side is provided with a transmitting means for transmitting a wake-up signal at a low speed, i.e., a low data rate, and subsequently a data signal at a high speed, i.e., a high data rate, and the receiver on the mobile side is provided with a wake-up signal receiving means composed of an amplifier having a low frequency band to which a power is constantly supplied and which receives the wake-up signal and actuates a switching means, a data signal receiving means composed of an amplifier having a high frequency band to which a power is supplied by the operation of the switching means so as to start the reception of the data signal, a signal processing means for outputting data to be transmitted on the basis of a data signal from the data signal receiving means, and a transmitting means for transmitting the data to be transmitted.

In the communication system having the above-described structure, the wake-up signal transmitted at a low speed by the transmitting means of the transmitter on the fixed side is received by the wake-up signal receiving means of the receiver on the mobile side to which a power is constantly supplied. The wake-up signal receiving means actuates the switching means when it receives the wake-up signal and supplies a power to the data signal receiving means, the signal processing means and the transmitting means. The receiver on the mobile side which is started by the supply of a power informs the transmitter on the fixed side that the receiver has been started by means of a predetermined response signal. The transmitter on the fixed side which has received the response signal starts the transmission of a data signal at a high speed subsequent to the wake-up signal by the transmitting means. The high-speed data signal is received by the data signal receiving means on the mobile side to which a power is supplied for starting operation, and processed by the signal processing means. The response or the data is then transmitted to the transmitter on the fixed side by the transmitting means on the basis of the processed result.

Since the wake-up signal is transmitted at a low speed irrespective of the transmission speed of the high-speed data, the frequency band of the wake-up signal receiving means exclusively for receiving the wake-up signal may be low in conformity with the transmission speed of the wake-up signal, so that it is possible to greatly reduce the constant current dissipation.

When data communication is necessary, a power is supplied to the data signal receiving means having a high frequency band, thereby enabling high-speed data transmission. Although the current dissipation of the data signal receiving means is increased because the frequency band is high, since the time necessary for data communication is much shorter than the time in which power is supplied to the wake-up signal receiving means to which power is constantly supplied and the transmission time is shortened inversely proportional to the transmission speed, the power dissipation per unit data is approximately the same.

Thus, a communication system which satisfies the antinomic demands for high-speed transmission and low power dissipation has been realized.

The structure of the system provided in another aspect of the present invention will now be explained. This system is interrogator/transponder system for transmitting interrogation data from a transmitter stationarily mounted in a certain fixed body and reflecting response data from a receiver mounted on a mobile object (not shown), or for transmitting data from the transmitter on the fixed side and storing the data in the receiver on the mobile side. The mobile communication system is provided with an entrance sensing means for sensing that the receiver on the mobile side has entered a good communication zone of the transmitter on the fixed side, so as to start the operation of the transmitter on the fixed side by the entrance sensing means. The transmitter on the fixed side is provided with an oscillator for generating a carrier signal of a microwave band, a data generator for generating the interrogation data having a data frame length which does not exceed a predetermined byte range, a transmitting means for transmitting the unmodulated carrier signal, a modulator for modulating the carrier signal in accordance with the interrogation data at a high speed, a transmitting means for transmitting the modulated carrier signal, a detector for the modulated carrier signal and a demodulator for demodulating the detected signal so as to obtain the response data. The receiver on the mobile side is provided with a receiving means for receiving the modulated carrier signal, a detector for detecting a receiving signal, a wake-up signal receiving means for receiving a wake-up signal so as to actuate a switching means, a demodulator for demodulating the detected signal so as to obtain the interrogation data, a data generator for generating the response data at a data frame length which does not exceed a predetermined byte range, a modulator for modulating the received unmodulated carrier signal in accordance with the response data at a high speed and a transmitting means for reflecting the modulated carrier signal. The "data frame length which does not exceed a predetermined byte range" means the amount of data to be transmitted in the case where the amount of data to be transmitted is not more than a predetermined byte range. When the amount of data to be transmitted is longer than the predetermined byte range, the amount of data to be transmitted is divided into a plurality of parts by a data frame length having the predetermined byte range as the maximum. The zone in which the electromagnetic signal emitted from the transmitting means of the transmitter on the fixed side is existent is generally composed of a zone I in which the electric field strength is adequately strong for secure communication, a zone III which is outside of the zone I and in which communication is impossible, and a zone II which is a field intermediate between the zones I and III and in which the electric field strength fluctuates, thereby easily causing a transmission error. The good communication zone means the zone I. By starting communication by the entrance sensing means at the stage at which the receiver on the mobile side enters the zone I, secure communication with very few communication errors is enabled. If the data frame length is less than the predetermined byte range, which is preferably 64 to 512 bytes, namely, if the data frame length is less than 64 bytes, for example, in the case of transmitting several hundred to several thousand characters having a data frame length of 16 bytes, which is ordinarily often adopted, the data must be transmitted at data frames of about several ten times or several hundred times. This requires a time for confirming whether or not the data is correct in each frame, resulting in the reduction in the transmission efficiency, thereby making the speedup of transmission impossible. If the data frame length exceeds 512 bytes, the ratio of overlooking error is increased and, hence, the error detection efficiency is lowered when reading a multiplicity of characters even by the use of a high-degree error detector (e.g., CRC) which will be described later. If there is a detection error, it is necessary to transmit again a multiplicity of characters, leading to the deterioration of the transmission efficiency, which is a problem in practical use. Therefore, in the present invention, the data frame length which satisfies the demand for both the increase in the error detection efficiency and speedup in practical use is in the range of 64 to 512 bytes, more preferably 128 to 256 bytes (see FIG. 5).

In the interrogator/transponder system having the above-described structure, after the entrance sensing means senses that the receiver on the mobile-side has entered the good communication zone (zone I), communication between the transmitter and the receiver is started by a direct wave by a carrier signal in a microwave band, thereby enabling secure communication under an adequate electric wave strength.

Since the microwave carrier signal is transmitted and received after it is modulated in accordance with interrogation data and response data having a long data frame length in the range of 64 to 512 bytes at a high speed, a large amount of data is transmitted at a high speed in a short time.

As described above, according to a mobile communication system of the present invention, communication between the transmitter on the fixed side and the receiver on the mobile side is enabled at a high speed and with security.

BRIEF DESCRIPTION OF THE DRAWINGS

FIG. 7 is a schematic perspective view of a mobile communication system including the detector of a transponder; and FIGS. 8 and 9 are block diagrams of conventional devices.

BEST MODE FOR CARRYING OUT THE INVENTION

An interrogator/transponder system in the best mode for carrying out the present invention is composed of a transmitter stationarily mounted in a certain fixed place and a receiver mounted on a mobile object so that the receiver on the mobile side which starts operation by the supply of a power to the entire circuit from a wake-up signal output from the transmitter on the fixed side modulates an electromagnetic signal emitted from the transmitter on the fixed side by a predetermined code and reflects a response so as to continuously communicate a command, data and so forth. The transmitter on the fixed side is provided with a transmitting means for transmitting the wake-up signal at a low speed and subsequently a data signal at a high speed for the transmission to the receiver on the mobile side, a clock generator for generating a transmission clock to the transmitting means, a modulating means composed of an oscillator for generating a carrier signal and a modulator for modulating a high-frequency carrier wave generated by the oscillator by a transmission signal, and an antenna means for emitting the high-frequency wave modulated in accordance with the transmission signal as an electromagnetic signal.

The receiver on the mobile side is provided with a detector for detecting the wake-up signal and the data signal from the received electromagnetic signal, a wake-up signal receiving means for amplifying and processing the wake-up signal transmitted at a low speed from the detected receiving signals, a data signal receiving means for amplifying and processing the data signal transmitted at a high speed from the detected receiving signals, and a switching means for turning ON a switch in accordance with an output of the wake-up signal receiving means so as to supply a power to the data signal receiving means, other signal processing means and transmitting means. The wake-up signal receiving means has a low frequency band in conformity with the wake-up signal transmitted at a low speed, and it is in the state of waiting for the wake-up signal from the transmitter on the fixed side while a power being constantly supplied thereto. The data signal receiving means has a high frequency band which sufficiently covers the data signal transmitted at a high speed and is actuated by the supply of a power in accordance with the wake-up signal.

Figure 2:
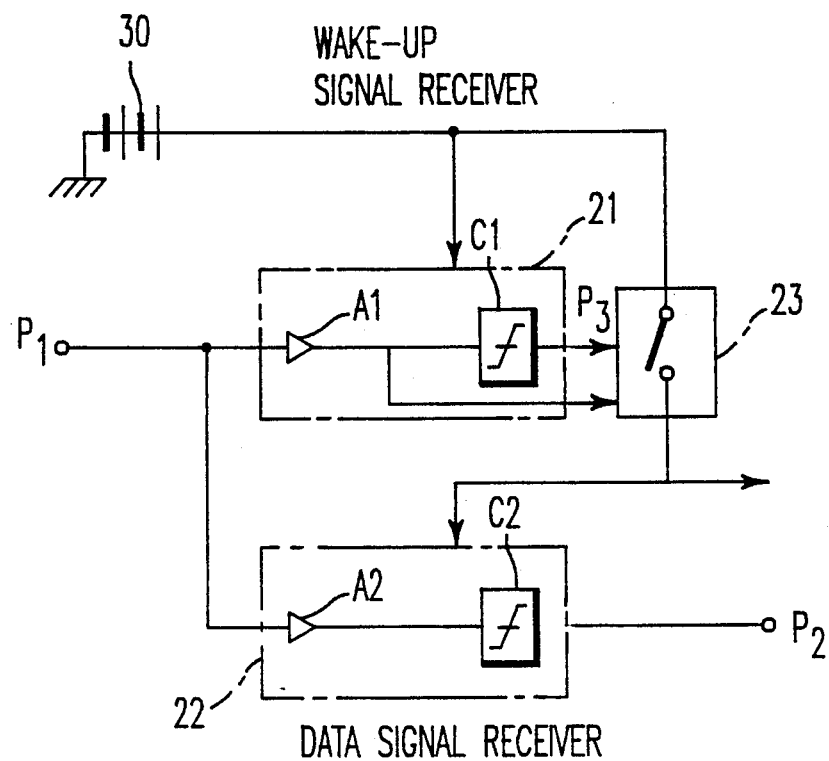
FIG. 2 is a diagram of an example of the concrete structures of a wake-up signal receiving means and a data signal receiving means.

The structure of the wake-up signal receiving means and the data signal receiving means will be explained in detail with reference to FIG. 2.

Figure 1:
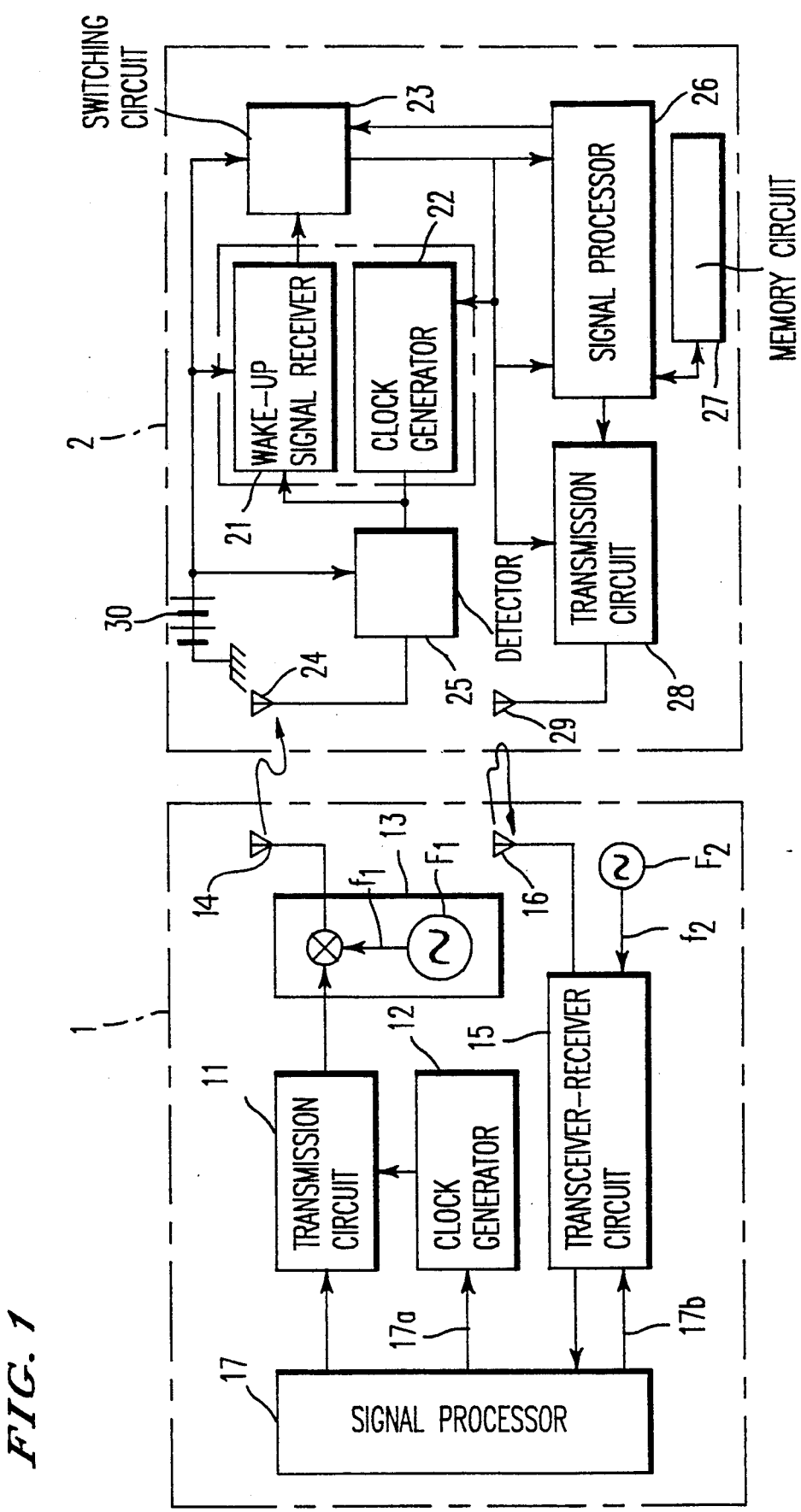
FIG. 1 is a block diagram of the entire structure of an embodiment of an interrogator/transponder system according to the present invention which is applied to tag communication.

A wake-up signal receiving circuit 21 is composed of an amplifier A1 for amplifying a wake-up signal transmitted at a low speed and detected by a detector 25 and a signal converting comparator C1 connected to the subsequent stage for converting the signal to a signal at a logic level. The output of the wake-up signal receiving circuit 21 is input to a control terminal of a switching circuit 23. The output of the amplifier A1 may be directly input to the control terminal of switching circuit 23, thereby obviating the signal converting comparator C1. A data signal receiving circuit 22 is composed of an amplifier A2 for amplifying a data signal transmitted at a high speed and detected by a detector 25 and a signal converting comparator C2 connected to the subsequent stage for converting the signal to a signal at a logic level. The output of the data signal receiving circuit 22 is input to a signal processor 26, as shown in FIG. 1.

Figure 3:
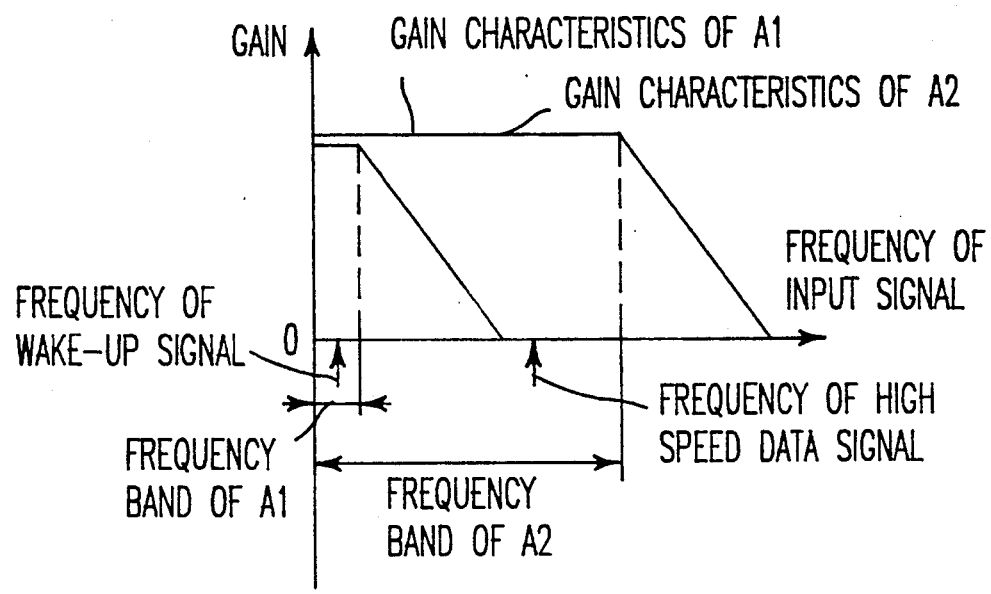
FIG. 3 is a graph showing the relationship between the frequency band and the gain of an amplifier.

The relationship between the frequencies of the signals input to the amplifiers A1, A2 and the frequency zones and the gains of the amplifiers A1, A2 is shown in FIG. 3. In the amplifier A1 included in the wake-up signal receiving circuit 21, a predetermined gain is obtained only in a low frequency band which covers the frequency of the wake-up signal transmitted at a low speed, while the amplifier A2 included in the data signal receiving circuit 22 has a predetermined gain to a high frequency band which covers the frequency of the data signal transmitted at a high speed.

"Wake-up signal transmitted at a low speed" here means that the transmission speed of the wake-up signal is lower than that of the data signal, and "data signal transmitted at a high speed" means that the transmission speed of the data signal is higher than that of the wake-up signal. (For example, if the transmission speed of the wake-up signal is not more than several kbps and the transmission speed of the data signal is not less than several kbps, it is expressed as "the wake-up signal is transmitted at a low speed and the data signal is transmitted at a high speed").

"Low-frequency band" here means a frequency band (e.g., not more than ten several kHz) in which the wake-up signal transmitted at a low speed can be transmitted and received without deformation, and "high-frequency band" here means a frequency band (e.g., not less than several ten kHz) in which the data signal transmitted at a high speed can be transmitted and received without deformation.

FIRST EMBODIMENT

FIG. 1 shows an example of an interrogator/transponder system according to the present invention which is applied to what is called tag communication. In FIG. 1, an interrogator 1 is stationary provided in any given fixed place. The interrogator 1 is composed of a transmission circuit 11 for transmitting a wake-up signal or a data signal including a command, as will be described later in detail, a clock generator 12 for supplying a predetermined clock for the transmission circuit 11 so as to change the signal transmission speed, a modulator 13 for modifying the carrier signal having a frequency f1 oscillated by an oscillator F1 by a signal transmitted from the transmission circuit 11, a transmission antenna 14 for transmitting the modulated wave as an electromagnetic signal, a transceiver-receiver circuit 15 for transmitting the high-frequency carrier signal having an unmodulated frequency f2 from an oscillator F2 and taking out a data signal from the carrier signal which is modulated and reflected by a transponder 2, a transmission-reception antenna 16 connected to the transceiver-receiver circuit 15 and a signal processor 17 including a microcomputer.

The receiver 2 on the mobile side constitutes the transponder (tag) and is mounted on an assembly part which moves on a production line or a mobile object such as an automobile. The transponder 2 is composed of a wake-up signal receiver 21 for receiving the wake-up signal, a data signal receiver 22 for receiving the data signal, a switching circuit 23 which is actuated by the wake-up signal receiver 21, a reception antenna 24 for receiving the electromagnetic signal transmitted by the transmission antenna 14, a detector 25 connected to the reception antenna 24 for detecting a modulated wave and obtaining the wake-up signal or the data signal, a signal processor 26 including a microcomputer, a memory circuit 27 for storing data, a transmission circuit 28 for transmitting the data signal including an identification signal, a transmission-reception antenna 29 for modulating the received unmodulated carrier signal of the frequency f2 in accordance with the data signal and reflecting the modulated carrier signal, and a power source 30 such as a battery.

The wake-up signal receiver 21, switching circuit 23 and the detector 25 are directly connected to the power source 30, and the data signal receiver 22, the signal processor 26, the memory circuit 27 and the transmission circuit 28 are connected to the power source 30 through the switching circuit 23.

Figure 4A:
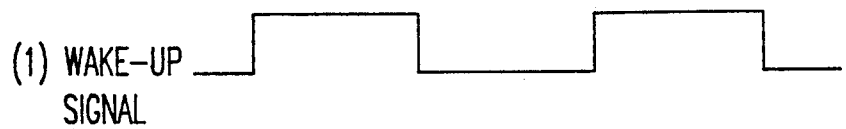
FIG. 4 is a signal time chart.
Figure 4B:
Figure 5:
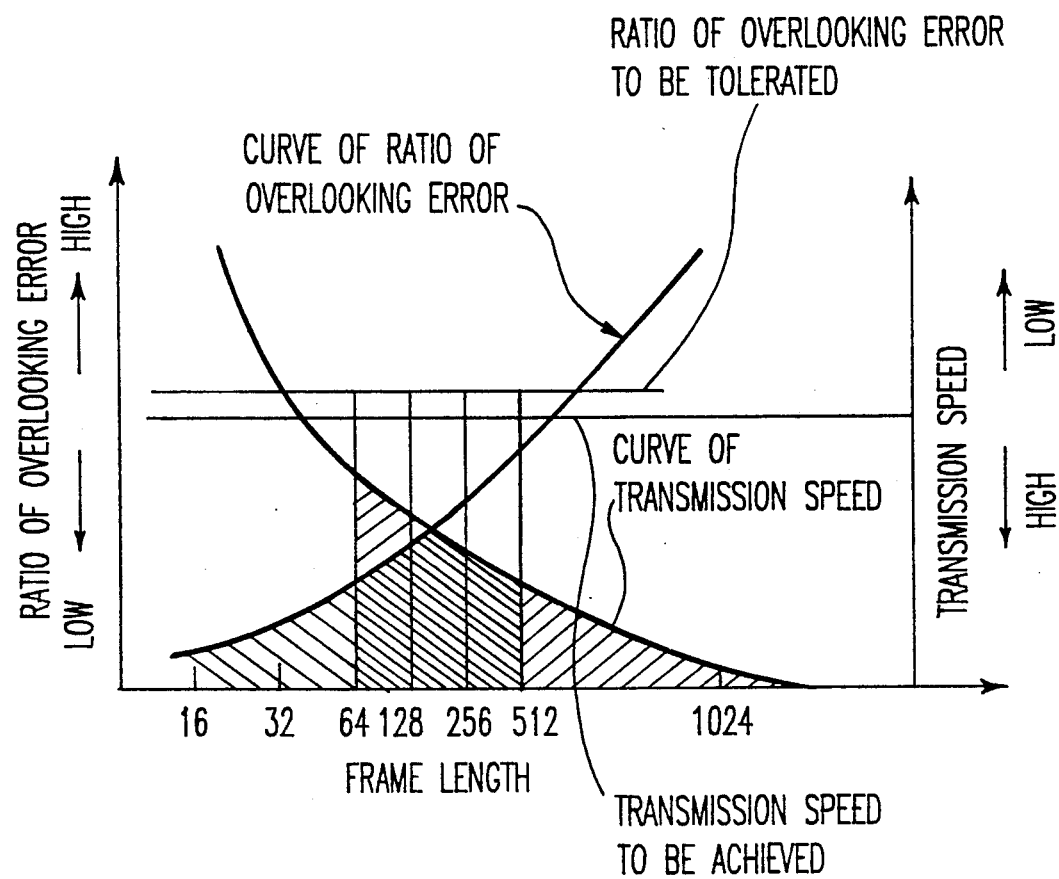
FIG. 5 is a graph explaining the transmission characteristics.

In the communication system having the above-described structure, the signal processor 17 of the interrogator 1 sets the output clock of the clock generator 12 so as to have a predetermined low frequency by a control signal 17a and transmits the wake-up signal to the transmission circuit 11. The wake-up signal is input to the modulator 13 after it is converted into a wake-up signal in the form of pulse trains (FIG. 4 (1)) which is synchronous with the output clock. The transmission antenna 14 modulates the carrier signal having the frequency f1 oscillated by the oscillator F1 by the wake-up signal and transmits the modulated electromagnetic signal. Simultaneously, the signal processor 17 actuates the transceiver-receiver circuit 15 by the control signal 17b, and transmits the unmodulated carrier signal having the frequency f2 oscillated by the oscillator F2 from the transmission-reception antenna 16. Although the two oscillators F1, F2 are used in order to use two separated carrier signals having the frequencies of f1 and f2, respectively, in this embodiment, the frequencies may be the same, and in this case, either of the oscillators may be used.

When the transponder 2 mounted on a mobile object enters the communication zone of the interrogator 1, the electromagnetic signal having the frequency f1 and modulated in accordance with the wake-up signal is received by the reception antenna 24, and detected and input to the wake-up signal receiver 21 having a low frequency band. The wake-up signal receiver 21 which has received the wake-up signal generates a switch actuating signal so as to actuate the switching circuit 23, whereby the supply of a power to each of the circuits 22, 26, 27 and 28 is started.

The signal processor 26 starts the operation so as to transmit the identification signal to the transmission circuit 28. The transmission circuit 28 modulates the unmodulated carrier signal transmitted to the transmission-reception antenna 29 by the identification signal and reflects the modulated signal to the interrogator 1. The interrogator 1 receives the modulated electromagnetic signal by the transmission-reception antenna 16 and supplies the identification signal to the signal processor 17 through the transceiver-receiver circuit 15.

When the signal processor 17 detects the identification signal, it transmits the control signal 17a to the clock generator 12 again, sets the output clock so as to have a predetermined high frequency and transmits the data signal to the transmission circuit 11. The data signal is input to the modulator 13 after it is converted into a data signal in the form of pulse trains (FIG. 4 (2)) which is synchronous with the output clock having a high frequency. The transmission antenna 14 modulates the carrier signal having the frequency f1 in accordance with the data signal and transmits the modulated electromagnetic signal.

The electromagnetic signal is received by the reception antenna 24 of the transponder 2, detected, input to the data signal receiver 22 for receiving a data signal having a high frequency band, and supplied to the signal processor 26 therethrough. The signal processor 26 stores the data signal into the memory circuit 27 if it is pure data. On the other hand, if the data signal is a command signal, the signal processor 26 reads out the necessary data signal from a predetermined address of the memory circuit 27, outputs the read data to the transmission circuit 28, modulates the unmodulated carrier signal having the frequency of f2 by the data signal and transmits the modulated carrier signal to the interrogator 1 through the transmission-reception antenna 29.

When communication is finished, a stopping signal is transmitted from, for example, the signal processor 17 of the interrogator 1. The stopping signal is input to the data signal receiver 22 of the transponder 2 through the antennae 14, 24, and the operation of the switching circuit 23 is stopped by the output of the signal processor 26, thereby cutting off the power supply to the circuit 26 and the other circuits 22, 27 and 28. In the experiments on high-speed (e.g., 32 Kbps) transmission carried by the present inventors, the dissipated current which is about 100 μA in a conventional system was reduced to an about several times to 20 times smaller value in the system according to the present invention.

In this embodiment, the entire part or a part of the functions of the transmission circuits 11 and the clock generator 12 of the interrogator 1 may be processed by a software of the signal processor 17 and in the case of using a random access memory (RAM) for the memory circuit 27 of the transponder 2, a power is constantly supplied to the RAM.

SECOND EMBODIMENT

Referring to FIG. 7, a mobile object M (not shown) which moved in the direction indicated by the arrow is provided with a transponder (tag) 102, which is a receiver on the mobile side, the structure of which will be described later in detail. A pair of antennae 114, 118 are provided above the path 105 for the mobile object M, and the antennae 114, 118 have a communication zone in the zone I which contains a part of the path 105 and which has a configuration close to a circle and are connected to an interrogator 101, which is the transmitter on the fixed side.

In the zone I, light-receiving photoelectric tubes 231, 141 and light-emitting photoelectric tubes 232, 142 are opposed to each other on the entrance side and the exit side, respectively, of the path 105 and each of the photoelectric tubes 231, 232, 141 and 142 is connected to the interrogator 101. When the transponder (tag) 102 moves on the path 105 and enters the zone I in which the electric field strength is adequately strong (the good communication zone I) and crosses the opposing photoelectric tubes, the light is intercepted and the light-receiving photoelectric tube 231 generates an entrance detection signal. When the transponder 102 exits from the zone I, the light of the light-receiving photoelectric tube 141 is intercepted, and an exit detection signal is generated. These photoelectric tubes 231, 232, 141, 142 are of a transmission type in this embodiment, but they may be on a reflection type and an object detecting device such as limit switch may be used in place of a photoelectric tube.

Figure 6:
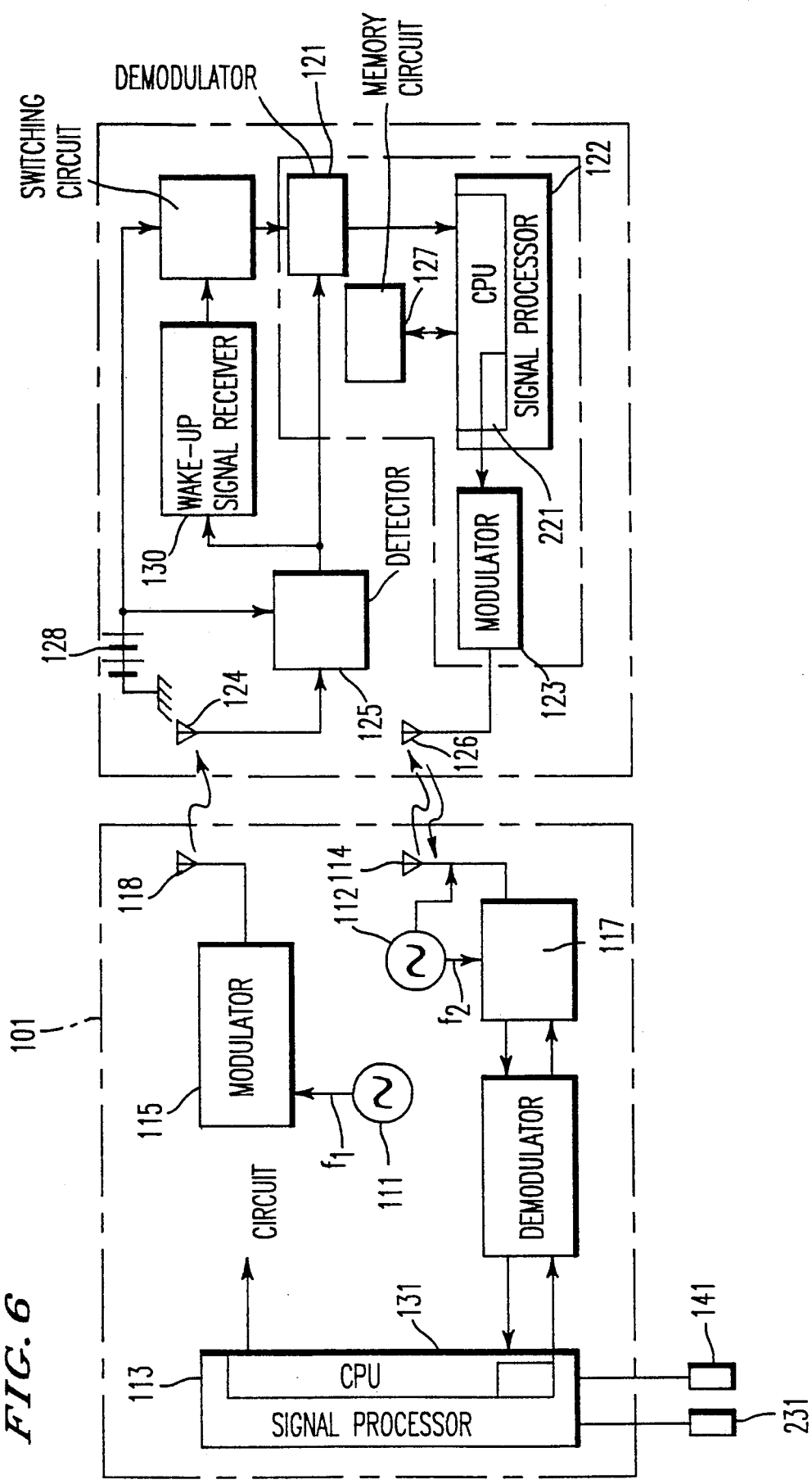
FIG. 6 is a block diagram of the entire structure of another embodiment of an interrogator/transponder system according to the present invention.

FIG. 6 shows the circuit structure of the interrogator 101 and the transponder 102 including the pair of antennae 114, 118.

The interrogator 101 has a signal processor 113 as an interrogation data generator and a means for confirming and processing response data. The signal processor 113 is provided with a microprocessor 131 which has a built-in circuit 132 for detecting an error of the response data (e.g., cyclic redundancy check=CRC). The entrance detection signal and the exit detection signal of the photoelectric tubes 231 and 141, respectively, are input to the signal processor 113.

The reference numeral 111 represents an oscillator for generating a carrier signal in a microwave band (2.45 GHz). The carrier signal is transmitted from the antenna 118 at a high speed such as 32 Kbps after the amplitude thereof is modulated by a modulator 115 in accordance with the interrogation data preferably having a data frame length of not less than 128 bytes which is output from the signal processor 113. The reference numeral 112 denotes an oscillator similar to the oscillator 111. The oscillator 112 output an unmodulated carrier signal to the antenna 114 and supplies a local oscillating signal for homodyne detection to a detector 117.

The detector 117 detects the modulated carrier signal which is reflected from the transponder 102 to the antenna 114 by a homodyne method, and the detection signal is demodulated by a demodulator 116 and input to the signal processor 113.

The transponder 102 has a signal processor 122 as a response data generator which is provided with a microprocessor 221 having a built-in error detector 222 (such as CRC) similarly to the above-described microprocessor 131. The signal for starting the transponder which is transmitted from the antenna 118 of the interrogator 101 is received by an antenna 124 as the carrier signal with the amplitude modulated and actuates a switching means 129 through a detector 125 and a wake-up signal receiver 130 so as to supply a power to the signal processor 122, a memory circuit 127, a demodulator 121, a modulator 123 and so forth. Thereafter, the interrogation data from the interrogator 101 to the transponder 102 is received by the antenna 124 in the form of a carrier signal with the amplitude modulated which is generated from the antenna 118, and the signal is regenerated in the form of interrogation data through a detector 125 and the demodulator 121 and input to the signal processor 122.

The response data output from the signal processor 122 is input to the modulator 123, which modulates the unmodulated carrier signal in accordance with the response data at a high speed and reflects the modulated carrier signal to the interrogator 101 through the antenna 126.

In the interrogator/transponder system having the above-described structure, when the transponder 102 mounted on a movable object on the path 105 enters the good communication zone I between the antennae 114, 118 and crosses the photoelectric tube 231, the photoelectric tube 231 generates an entrance detection signal. The signal processor 113 which has received the entrance detection signal outputs the wake-up signal for the transponder 102 as an interrogation signal, and the carrier signal f1 is modulated in accordance with the interrogation signal and output from the antenna 118. The modulated carrier signal is received by the antenna 124, detected and demodulated in accordance with identification data and input to the signal processor 122. The signal processor 122 outputs a predetermined response signal as a response signal indicating the end of the starting operation, and the modulator 123 modulates the unmodulated carrier signal received from the antenna 114 in accordance with the response signal. The modulated carrier signal is received again by the antenna 114, detected, demodulated and input to the signal processor 113 as a response signal.

Thereafter, an interrogation signal is generated, as occasion demands. For example, a write-into-tag command data is generated so as to transmit writing data from the interrogator 101 to the transponder 102 or read-out-from-tag command data is generated so as to obtain reading data from the transponder 102. The signal processor 122 of the transponder 102 stores the data portion into the memory circuit 127 if the data signal is write-into-tag command data. On the other hand, if the data signal is read-out-from-tag command data, the signal processor 122 reads out the necessary data from a predetermined address of the memory circuit 127, outputs the read data to the modulator 123 and transmits the data to the interrogator. In transmitting and receiving these data, the data frame length is set at a sufficiently long frame length such as 128 bytes. Error detection is carried out by detectors 132, 222 at every data frame which constitutes the data, and if a transmission error is detected, a re-transmission command is immediately generated from the interrogator 101 or the transponder 102 in a receiving state.

When the transponder 102 crosses the photoelectric tube 141 and exits to the outside of the good communication zone, the photoelectric tube 141 generates an exit detection signal and the signal processor 113 of the interrogator 101 issues a communication end command, thereby cancelling the communicating state.

In the above operation of the system, since the communication between the interrogator and the transponder is carried out in a zone in which the electric field strength is sufficiently large only by direct waves, reliable and secure communication is enabled. Especially, in this embodiment, since a transmission error is detected by a hardware at each data frame by CRC, which is a high-degree error detection method, more secure and faster communication is enabled than by a conventional error detection using a software.

In addition, since communication is carried out by a direct wave of the carrier signal in a microwave band, the ratio of error generation is low, and by modulating data having a sufficiently long data frame preferably in the range of 64 to 512 bytes, more preferably in the range of 128 to 256 bytes at a high speed, efficient communication is possible.

INDUSTRIAL APPLICABILITY

According to the present invention, communication of a large amount of data in a restricted time is enabled, thereby facilitating the collection of production indicating information or inspection data in a factory production line. When transmitting data between the transponder mounted on an automobile and the transmitter (interrogator) on the ground by utilizing the high-speed transmission, secure data transmission is enabled even if the automobile travels at a high speed. Since high-speed communication is possible, there is sufficient time for double or triple transmission. In addition, since it is possible to deliver communication only in a zone in which the electric field strength is strong (good communication zone), the security of communication is greatly enhanced.

What is claimed is:

1. An interrogator/transponder system comprising:
   a transmitter stationarily mounted on a fixed side; and
   a receiver mounted on a mobile side;
   said transmitter on the fixed side comprising a transceiver for transmitting a wake-up signal at a low date rate and subsequently a data signal at a high data rate; and
   said receiver on the mobile side comprising wake-up signal receiving means composed of an amplifier having a low frequency band to which a power is constantly supplied and which receives said wake-up signal and actuates a switching means, data signal receiving means composed of an amplifier having a high frequency band to which a power is supplied by the operation of said switching means so as to start the reception of said data signal, signal processing means for outputting data to be transmitted on the basis of said data signal from said data signal receiving means, and transmitting means for transmitting said data to be transmitted.

2. A transponder device comprising:
   receiving means mounted on a mobile object so as to receive a wake-up signal transmitted at a low data rate and subsequently a data signal transmitted at a high data rate;
   starting means composed of an amplifier having a low frequency band to which a power is constantly supplied and which amplifies said wake-up signal transmitted at a low data rate prior to said data signal transmitted at a high data rate and outputs an actuation signal;
   switching means for supplying a power on the basis of said actuation signal output from said starting means;
   data signal receiving means composed of an amplifier having a high frequency band which amplifies said data signal output from said receiving means after said wake-up signal when a power is supplied from said switching means;
   a signal processing means for outputting data to be transmitted by processing said data signal amplified by and output from said data signal receiving means; and
   transmitting means for transmitting said data signal output from said signal processing means.

3. An interrogator/transponder system according to claim 1, wherein said transmitter on the fixed side comprises transmitting means for transmitting a wake-up signal at a low data rate and subsequently a data signal at a high data rate, a clock generator for supplying a transmission clock to said transmitting means, modulating means composed of an oscillator for generating a carrier signal and a modulator for modulating a high-frequency signal generated by said oscillator; and an antenna for emitting said high-frequency signal modulated in accordance with a transmission signal as an electromagnetic signal.

4. An interrogator/transponder according to any of claims 1 to 3, wherein said receiver on the mobile side comprises a detector for detecting said wake-up signal or said data signal from the received electromagnetic signal, wake-up signal receiving means for amplifying and processing said wake-up signal transmitted at a low data rate among the detected reception signal, data signal receiving means for amplifying an processing said data signal transmitted at a high data rate among said detected reception signal, and switching means for turning ON a switch in accordance with the output of said wake-up signal receiving means so as to supply a power to said data signal receiving means, other signal processing means and transmitting means.

5. An interrogator/transponder system for transmitting interrogation data including writing data from a transmitter stationarily mounted on a fixed side and reflecting response data including reading data from a receiver mounted on a mobile side, comprising:

entrance sensing means for sensing that said receiver on the mobile side has entered a good communication zone of said transmitter on the fixed side so as to start the operation of said transmitter on the fixed side;

wherein said transmitter on the fixed side comprises an oscillator for generating a first carrier signal of a microwave band, a data generator for generating said interrogation data having a data frame length which does not exceed a predetermined byte range, a transmitting means for transmitting an unmodulated second carrier signal, a modulator for modulating said first carrier signal in accordance with said interrogation data at a high data rate, and a demodulator for demodulating the modulated carrier signal so as to obtain said response data; and said receiver on the mobile side comprises a demodulator for demodulating said modulated carrier signal so as to obtain said interrogation data, a data generator for generating said response data having a data frame length which does not exceed a predetermined byte range, and transmitting means for modulating said unmodulated carrier signal in accordance with said response data and reflecting the modulated carrier signal.

6. An interrogator/transponder system according to claim 5, wherein said data generators generate said interrogation data and said response data, respectively, with a data frame length in the range of 64 to 512 bytes as the maximum frame length.

7. An interrogator/transponder system according to claim 5, wherein said data generators generate said interrogation data and said response data, respectively, with a data frame length in the range of 128 to 256 bytes as the maximum frame length.

8. An interrogator/transponder system according to claim 1, further comprising:

entrance sensing means for sensing that said receiver on the mobile side has entered a good communication zone of said transmitter on the fixed side so as to start the operation of said transmitter on the fixed side;

said transmitter on the fixed side comprising an oscillator for generating a first carrier signal of a microwave band, a data generator for generating said interrogation data having a data frame length which does not exceed a predetermined byte range, a transmitting means for transmitting an unmodulated second carrier signal, a modulator for modulating said first carrier signal in accordance with said interrogation data at a high data rate, and a demodulator for demodulating the modulated carrier signal so as to obtain said response data; and said receiver on the mobile side comprising a demodulator for demodulating said modulated carrier signal so as to obtain said interrogation data, a data generator for generating said response data having a data frame length which does not exceed a predetermined byte range, and transmitting means for modulating said unmodulated carrier signal in accordance with said response data and reflecting the modulated carrier signal.

* * * * *